June 27, 1967 P. G. IVANCHICH 3,327,817
SEMIAUTOMATIC POWER TRANSMISSION SYSTEM FOR VEHICLE DRIVELINES
Filed Oct. 15, 1965 11 Sheets-Sheet 6

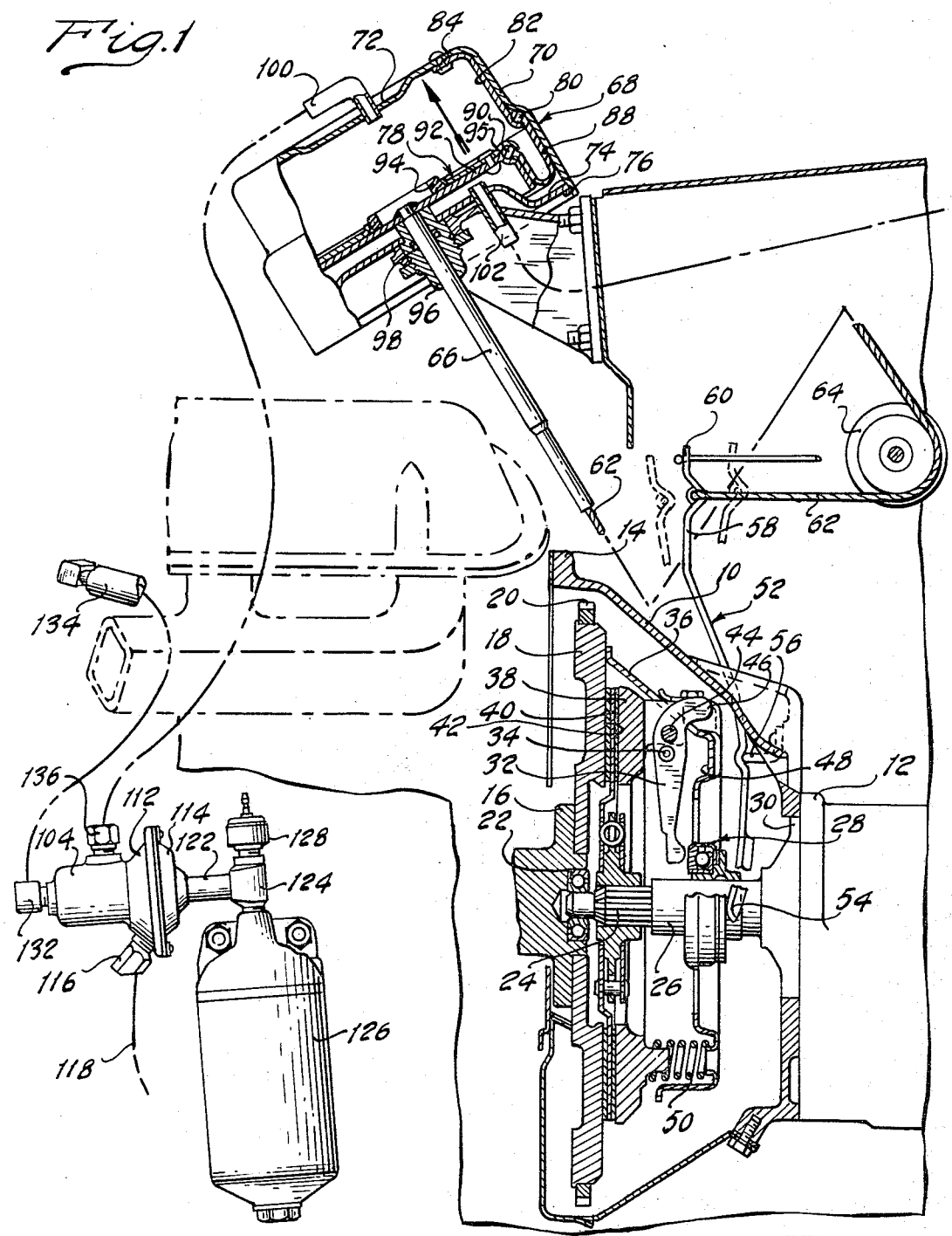

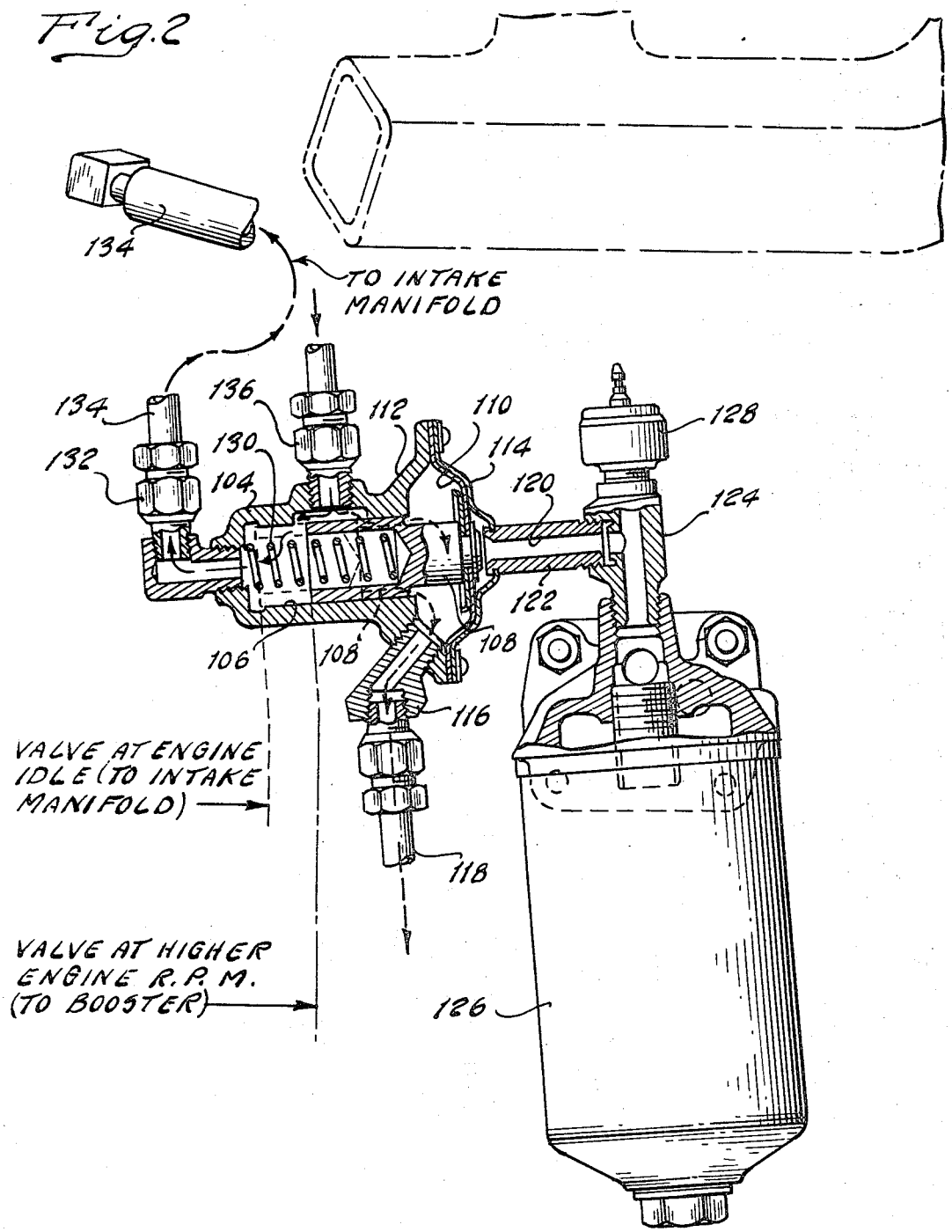

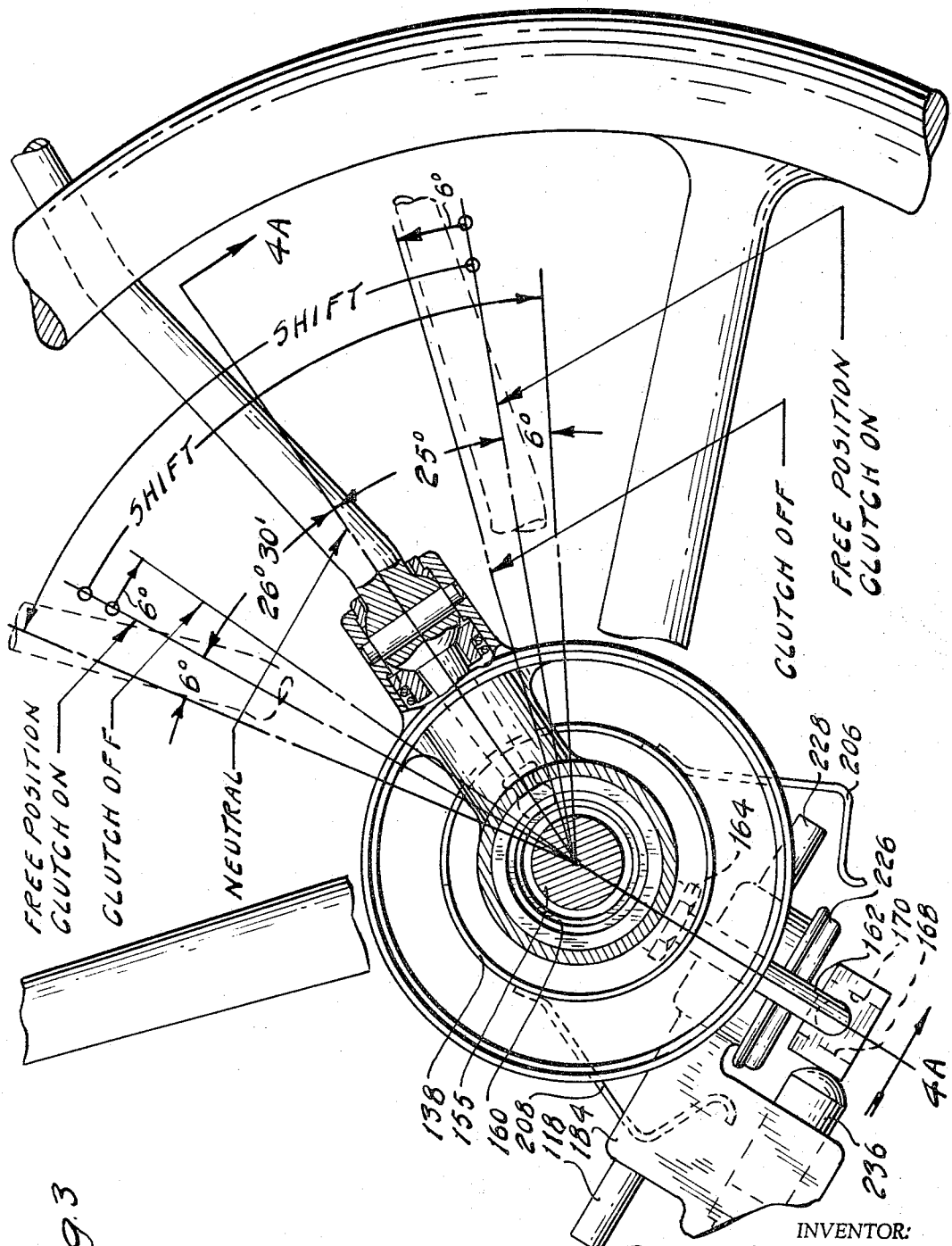

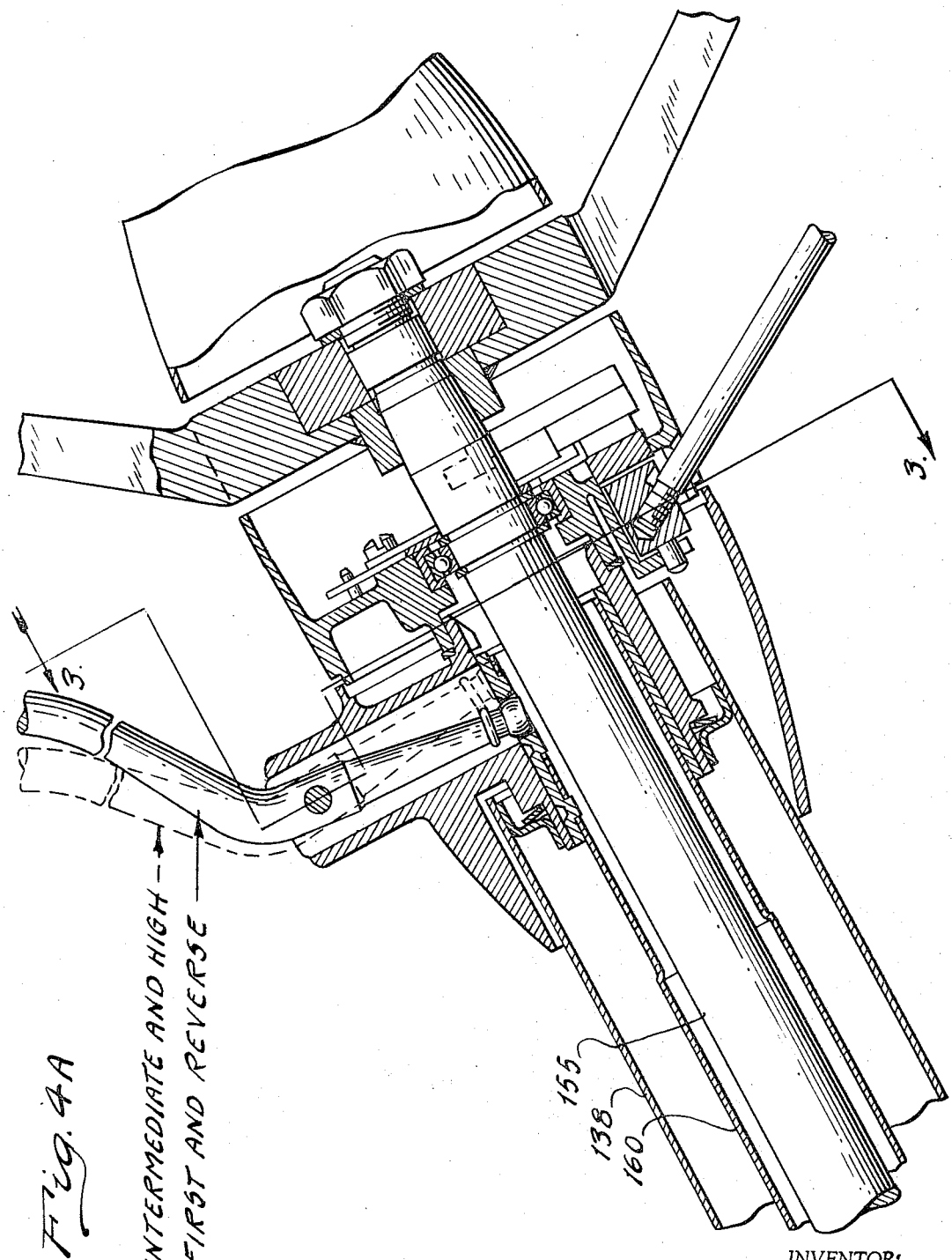

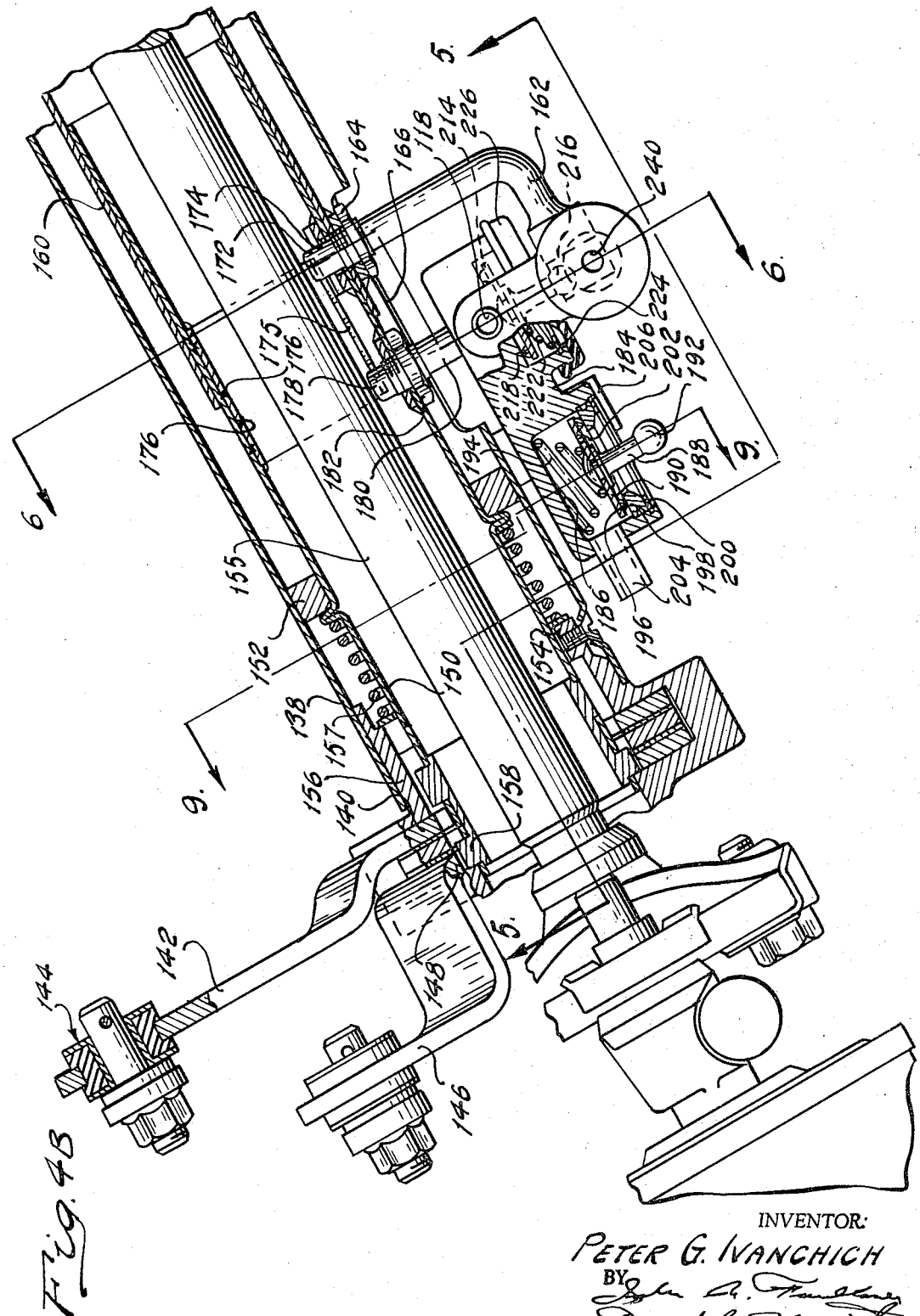

INVENTOR:
PETER G. IVANCHICH
BY
ATTORNEYS.

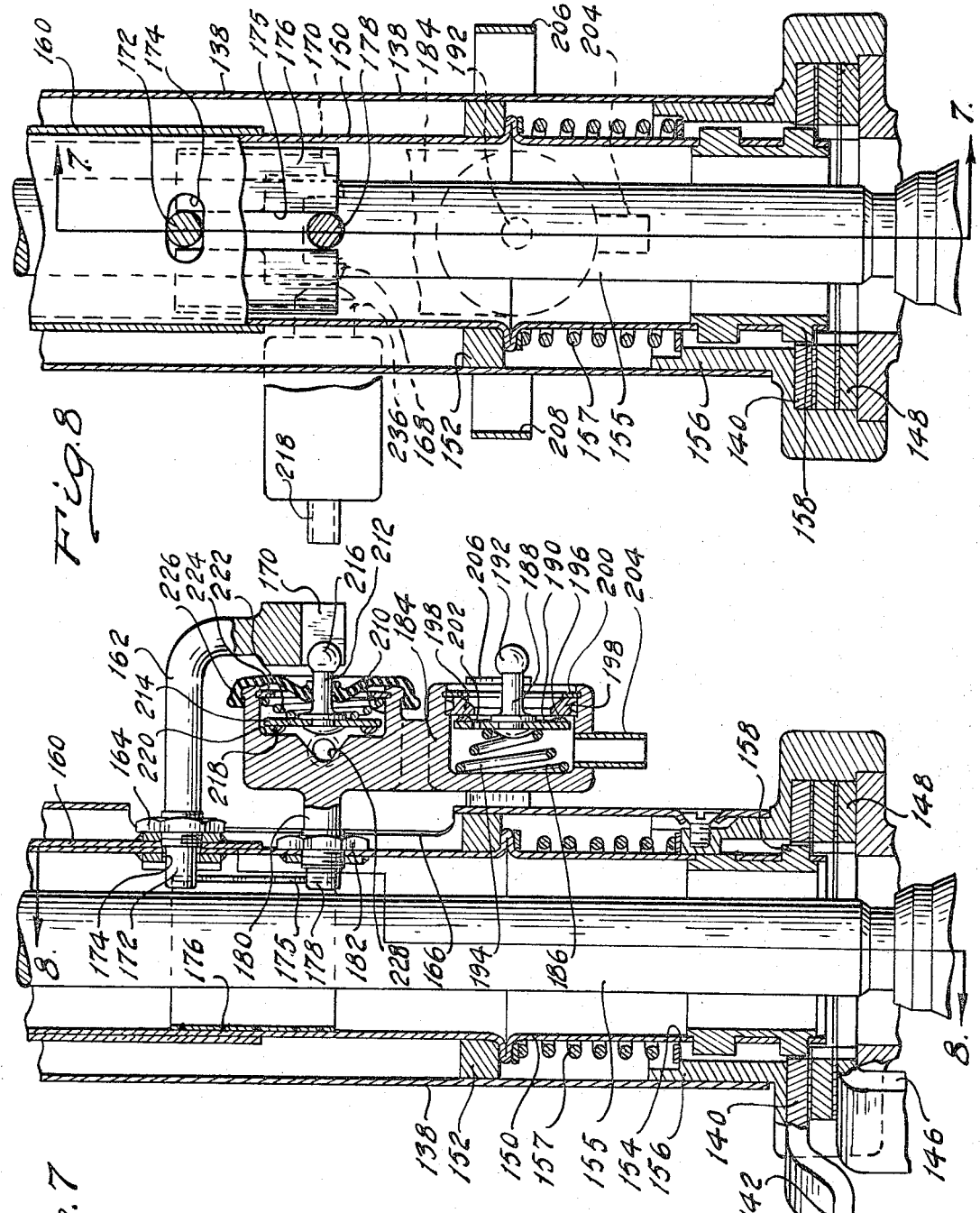

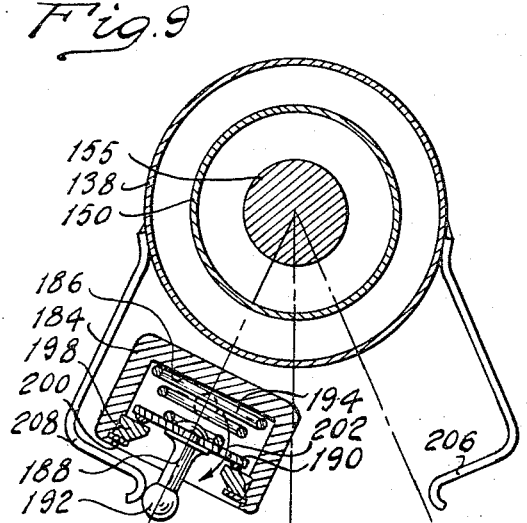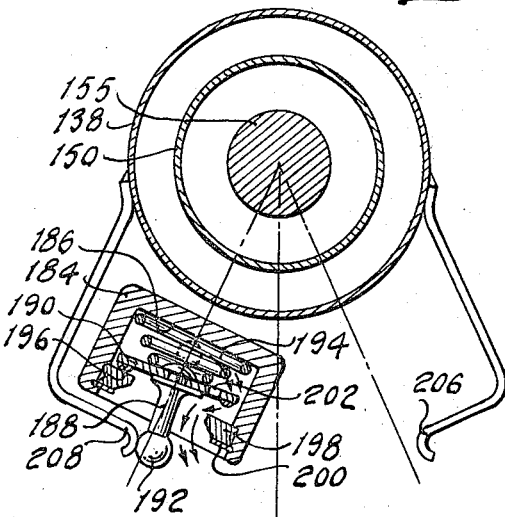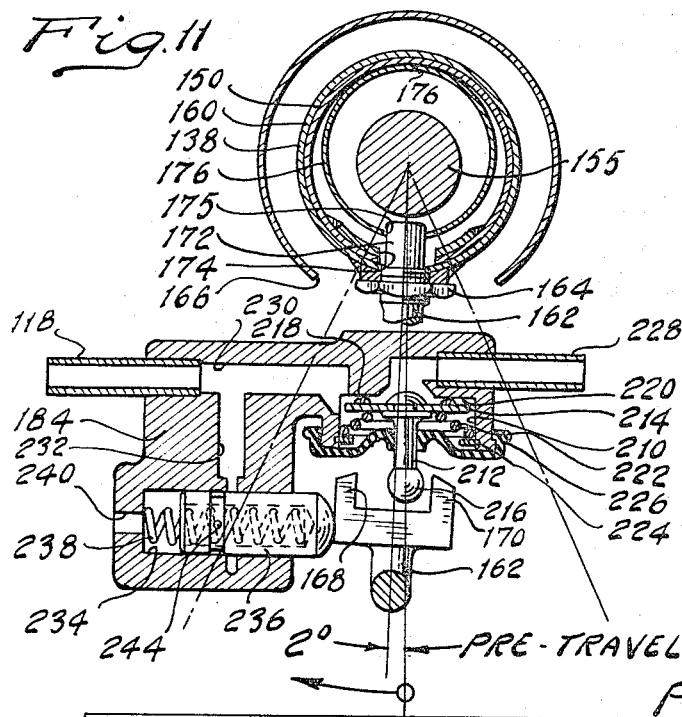

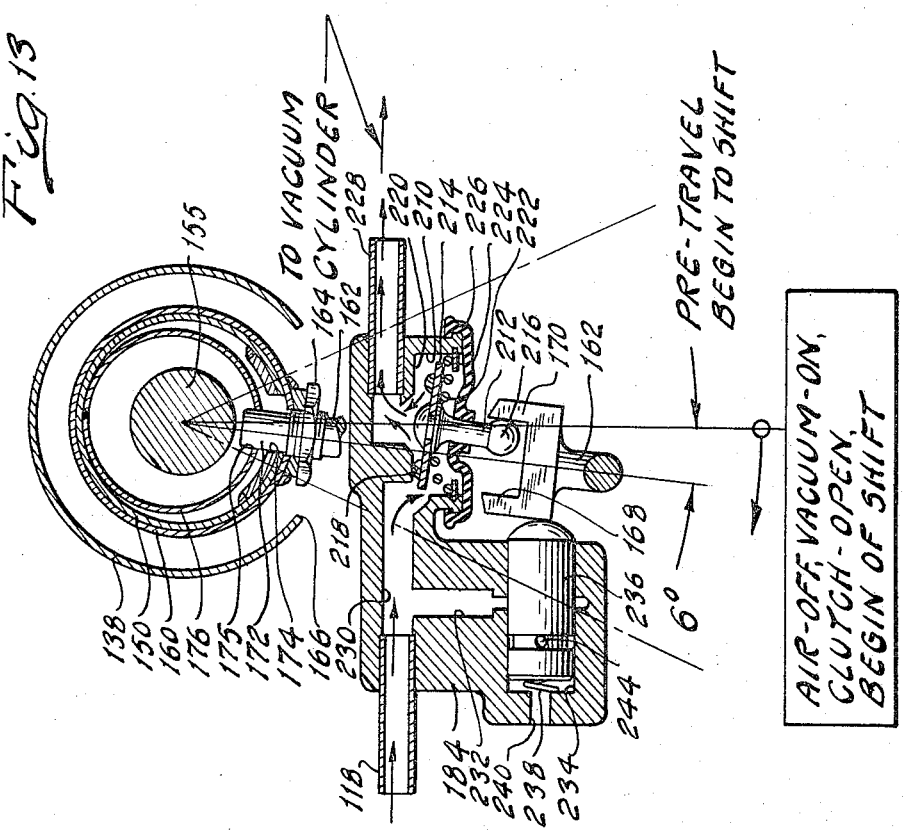
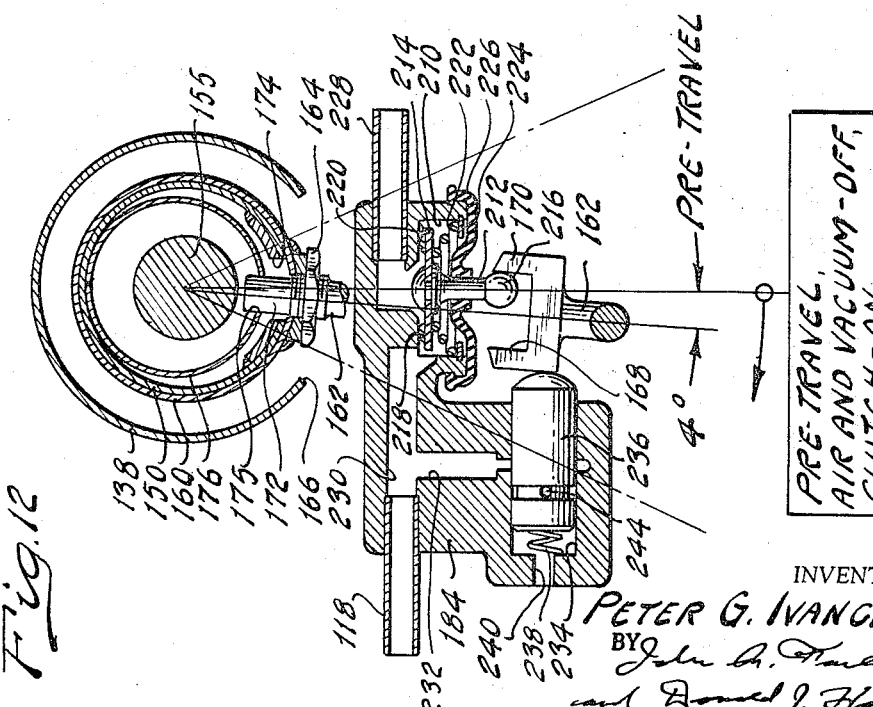

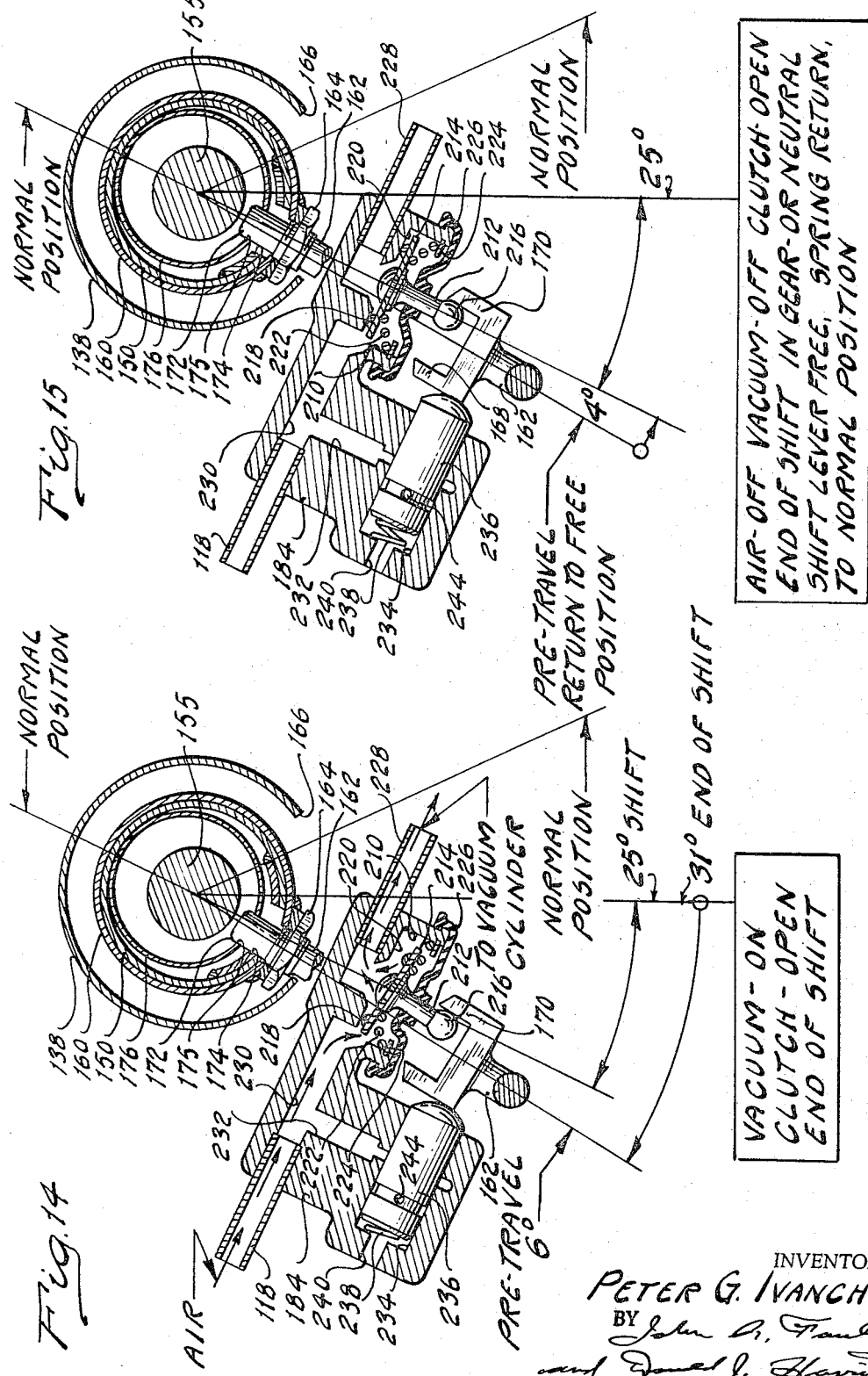

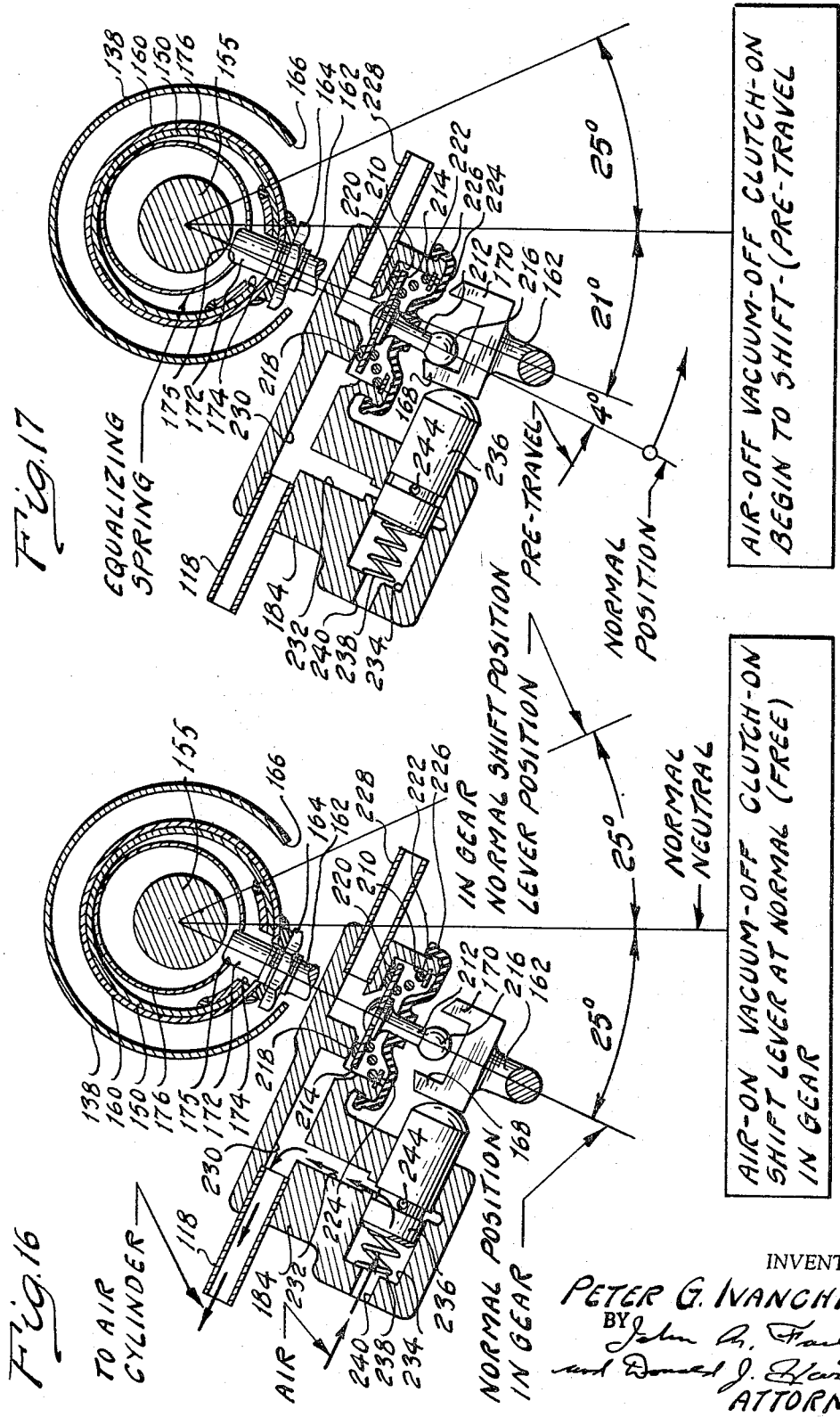

United States Patent Office 3,327,817
Patented June 27, 1967

3,327,817
SEMIAUTOMATIC POWER TRANSMISSION SYSTEM FOR VEHICLE DRIVELINES
Peter G. Ivanchich, Dearborn, Mich., assignor to Ford Motor Company, Dearborn, Mich., a corporation of Delaware
Filed Oct. 15, 1965, Ser. No. 496,339
13 Claims. (Cl. 192—.075)

My invention relates generally to multiple speed ratio power transmission mechanisms having semiautomatic speed ratio shift controls, and more particularly to a power transmission system for an automotive vehicle driveline wherein ratio shifts can be made by the vehicle operator by appropriately adjusting a single control member to condition the transmission for any torque requirement.

In a driveline that employs the improvements of my invention, an internal combustion vehicle engine serves as the source of torque. The crankshaft of the internal combustion engine is drivably connected to the vehicle traction wheels through torque delivery paths defined by multiple speed ratio gearing. A power input element of the gearing is connected to the crankshaft through a selectively engageable friction clutch.

The friction clutch can be applied and released by means of an automatic servo that is in communication with the engine intake manifold so that a decrease in manifold pressure will result in clutch disengagement. The clutch normally is engaged under the influence of spring pressure and released by the clutch releasing force of the servo.

During the interval in which the clutch is released, the driver, by means of a manually controlled shift lever, effects shifting movement of sliding gears or synchronizer clutch elements in the torque delivery gearing to establish a speed ratio change.

The provision of a semiautomatic transmission of this type being a principal object of my invention, it is a further object of my invention to provide a transmission system for use in an automotive vehicle driveline wherein an engine manifold pressure operated friction clutch is used for interrupting and establishing a torque delivery path, and wherein provision is made for triggering the operation of the clutch in response to shifting movement of the driver controlled shift lever that is used for initiating ratio changes in the multiple speed ratio gearing. I contemplate that in this way the use of an independent, driver operated, clutch operating leverage system will be unnecessary. A single control lever in the form of a steering wheel mounted gearshift can be employed both for changing the speed ratio in the gearing and for engaging and releasing the friction clutch.

It is another object of my invention to provide a semiautomatic transmission system of the type above set forth wherein a pneumatic servo is used for controlling the operation of the associated friction clutch. The servo can be controlled by means of a valve element situated at a convenient location where it can be triggered by movable elements of the transmission shift linkage that is under the control of the operator.

It is a further object of my invention to provide a semiautomatic transmission control system of the type above set forth wherein the pneumatic servo that controls the friction clutch is actuated upon initial movement of the transmission shift linkage by the operator. Further movement of the linkage by the operator results in normal shifting movement of the torque delivery elements in the gearing. Final movement of the shift linkage mechanism results in a return of the pneumatic servo to its original starting position which it assumed before the ratio change was initiated.

It is a further object of my invention to provide a semiautomatic transmission control system that can be adapted readily for use in any of a variety of manually controlled transmission systems now used in the industry. I contemplate that this can be done with a minimum space penalty and with a minimum cost.

It is a further object of my invention to provide a semiautomatic control system for a vehicle transmission mechanism having a pneumatically operated friction clutch that responds to engine manifold pressure wherein provision is made for interrupting the torque delivery path when the vehicle coasts to a stop with the engine idling.

It is another object of my invention to provide a control system of the type above set forth wherein a ratio shift to the low speed ratio or to a reverse drive ratio under zero torque is accomplished by cushioning the clutch engagement thereby eliminating an undesirable harshness that normally would accompany such a zero torque shift.

Other objects and features of my invention will become apparent from the following description and from the accompanying drawings, wherein:

FIGURE 1 shows a longitudinal cross sectional view of a friction clutch capable of being used in my improved driveline;

FIGURE 2 shows in partial cross section a lubricating oil pressure valve that establishes and disestablishes a direct connection between the pneumatic clutch operating servo and the engine intake manifold;

FIGURE 3 shows in longitudinal cross sectional form, in the plane of section line 3—3 of FIGURE 4A, the column assembly for an automotive vehicle steering system and transmission shift leverage assembly;

FIGURES 4A and 4B show a transverse cross sectional view taken along the plane of section line 4A—4A of FIGURE 3;

FIGURE 5 is a view of the lower end of the steering column as it appears from the plane of section line 5—5 of FIGURE 4B;

FIGURE 6 is a cross sectional view taken along the plane of section line 6—6 of FIGURE 5 showing the air cushion valve;

FIGURE 7 is a longitudinal sectional view taken along the plane of section line 7—7 of FIGURE 8. It shows the same structure as FIGURE 6;

FIGURE 8 is a longitudinal sectional view taken along the plane of section line 8—8 of FIGURE 7;

FIGURES 9 and 10 are views taken along the plane of section line 9—9 of FIGURE 4B, although they show the clutch servo control valves in various operating positions to illustrate the semiautomatic shift cycle, and FIGURES 11 through 17 are views similar to FIGURE 6 although the valve elements are shown in different operating positions.

In FIGURE 1, numeral 10 designates the clutch housing which forms a part of an automatic transmission housing, the main portion of which is indicated at 12. The periphery 14 of the housing 10 may be bolted to the engine block of an internal combustion vehicle engine. A crankshaft of the vehicle engine, shown in part at 16, is bolted to a flywheel 18 located within the clutch housing 10. An engine starter ring gear 20 is carried by the periphery of the flywheel 18 in the usual fashion.

A pilot bearing 22 is located within a pilot opening formed in the end of the crankshaft 16. Bearing 22 supports one end of an externally splined power input shaft 24 for a multiple speed ratio, manually-controlled, power transmission mechanism. An internally splined hub for a clutch disc assembly is drivably carried by the shaft 24 within the housing 10.

Shaft 24 is received through a stationary clutch throwout bearing support sleeve 26 on which is slidably positioned a clutch throwout bearing assembly 28. The sleeve 26 is connected to an adapter plate 30 which is bolted to the transmission housing 12. Bearing 28 slides axially upon the sleeve 26 and is adapted, when it is shifted in a left-hand direction as viewed in FIGURE 1, to engage the radially inward ends of clutch release levers 32. The levers 32 are pivoted by means of pivot shaft 34 to a clutch housing 36. The housing 36 is secured by bolts or by any other suitable fastening means to the periphery of the flywheel 18 so that it rotates with the flywheel as part of a common assembly.

A clutch pressure plate 38 is located within the clutch housing 36. It is formed with a friction surface 40 situated in juxtaposed relationship with respect to a friction surface 42 formed on the flywheel 18. A clutch disc splined to shaft 24 is located between the surfaces 40 and 42.

The clutch release levers 32 are pinned by means of pins 44 to the pressure plate 38. Radially outward portions of the levers 32 are displaced axially as shown at 46. These ends are formed with a relatively large mass so that the centrifugal force created upon rotation of the clutch housing 36 will tend to produce a clutch engaging force on the pressure plate 38.

Housing 36 is formed with pockets 48 which receive clutch engaging compression springs 50. The springs act directly upon the pressure plate 38 thereby normally tending to engage the clutch.

The clutch throwout bearing control lever 52 extends through an opening in the housing 10. It is formed with a forked end 54 which straddles the sleeve 26. The forked end engages one side of the clutch throwout bearing assembly 28 and an intermediate portion of the lever 52 is pivoted on a pivot element 56 secured to the housing 12. The extended end 58 of the lever 52 is adapted to be engaged by a clutch-release pullout cable that is under the control of the vehicle operator. The cable connection is shown at 60. The clutch can be disengaged manually by applying a force on the cable. I have found that 88 pounds is sufficient to effect clutch disengagement.

As the pullout cable is tensioned, lever 52 will pivot in a clockwise direction, as viewed in FIGURE 1, about the element 56. This causes forked end 54 to shift the bearing assembly 28 in a left-hand direction. This then causes the clutch release lever 32 to pivot in a clockwise direction thereby withdrawing the pressure plate 38 against the opposing force of the clutch engaging springs 50.

The lever 52 also is connected at its outer end to a clutch release cable 62, which may be trained over a guide pulley 64 rotatably mounted upon the stationary housing 12 at a convenient location. Cable 62 is connected in a suitable fashion to a piston rod 66 for a pneumatic clutch control servo indicated generally by reference character 68.

The servo 68 comprises a cylinder 70 having an end wall 72 and a closure plate 74. Plate 74 can be secured axially fast within the cylinder 70 by a snap ring 76. A diaphragm assembly 78 is located within the cylinder 70. Its outer periphery 80 is secured to the cylindrical wall of the cylinder 70 by a clamping ring 82. Rivets 84 can be used for securing the clamping ring 82 in place.

The diaphragm itself which is indicated at 88, includes an inner margin 90 which is secured to a diaphragm plate 92 by a clamping ring 95. Piston rod 66 is fixed to the center of the plate 92. A rubber bumper 94 limits the relative movement of the diaphragm assembly 78 in an upward direction as viewed in FIGURE 1.

Piston rod 66 is slidably positioned within an adapter 96. An O-ring seal 98 isolates the interior of the cylinder 70 to define a pair of opposed pneumatic pressure chambers. One chamber communicates with a manifold pressure conduit 100. The other chamber communicates with a cushion air conduit 102. Movement of the piston assembly 78 occurs under the influence of the pressure differential of the two cylinder chambers.

Passage 100 communicates with the lubrication valve illustrated in FIGURE 2. This valve comprises a housing 104 within which is formed a valve chamber 106. Slidably disposed in this valve chamber is a cylindrical valve element 108, one end of which is secured to the center of the flexible diaphragm 110. The diaphragm 110 is disposed within a diaphragm chamber that is defined by a flanged portion 112 of the housing 104 and by an end cover 114. The periphery of the diaphragm 110 is clamped between the housing portion 112 and the cover 114 as the latter is secured to the former. The portion of the chamber on the left-hand side of the diaphragm 110, as viewed in FIGURE 2, communicates through a fitting 116 with an air pressure passage 118, the function of which will be explained subsequently. The portion of the diaphragm chamber on the right-hand side of diaphragm 110, as viewed in FIGURE 2, communicates with the lubrication oil passage 120 formed in an adapter 122. An oil filter fluid fitting 124 is connected to the adapter 122. This fitting forms a part of the lubricating oil passage that extends from the vehicle engine lube pump to an oil filter housing 126 within which is situated an oil filter for filtering the lubricating oil for the engine. An oil pressure indicating pressure switch 128 can be disposed in fluid communication with the lubricating oil passage of which the fitting 124 forms a part.

The magnitude of the pressure in passage 120 increases as the engine speed increases. This pressure acts upon the diaphragm 110 and tends to urge the valve 108 in a left-hand direction, as viewed in FIGURE 2. A valve spring 130 tends normally to maintain the valve element 108 in a right-hand position.

The valve chamber 106 communicates through a fitting 132 with an engine intake manifold pressure passage 134. The previously described passage 100 communicates by means of a fitting 136 with the chamber 106 at an intermediate location. When the valve element 108 is in the position shown, communication is established between passages 100 and 134. In this instance, engine intake manifold pressure is made available directly to the servo 68. When the engine speed increases to a speed greater than idle speed, the lubricating oil pressure in passage 120 is sufficient to urge the valve element 108 in a left-hand direction. In this case, passage 118 is brought into communication with passage 100 and communication between passage 100 and passage 134 is interrupted.

Under certain conditions, a manifold booster pressure will be available to passage 118 to initiate disengagement of the friction clutch. At other times the passage 118 is disconnected from the source of manifold booster pressure and is connected instead to an air vent. Vacuum booster pressure is replaced by atmospheric pressure which deactivates the servo 68 thereby permitting the friction clutch to become applied under spring pressure.

In FIGURE 4B, I have illustrated in cross sectional form the construction of the lower end of the steering column assembly of the type of assembly used in automotive vehicles. The upper end is shown in FIGURE 4A. It includes a steering column tube 138 which is connected to the stationary part of the vehicle chassis. Journalled on the lower end of the tube 138 is a hub 140 for a gearshift lever 142. This lever 142 is connected by means of a suitable pivotal connection 144 to a speed ratio shift mechanism within the torque transmitting gearing, not shown. Lever 142 can be caused to control speed ratio shifts from an intermediate, underdrive ratio to a direct-drive, high speed ratio. It can control also shifts from the high-speed ratio back to the intermediate, underdrive ratio as it is oscillated from one operating position to another.

A low-and-reverse gear shift lever 146 also is mounted at the base of the tube 138 with its hub 148 surrounding the axis of the tube 138. A gear shift tube 150 is mounted for both oscillating motion and reciprocating motion within the stationary tube 138, a suitable bushing 152 being provided for this purpose. Tube 150 surrounds steering shaft 155. It is slidably positioned within an opening 154 formed in a mounting sleeve 156 carried in the lower end of the tube 138. A spring 157 urges it normally in an upward direction.

A key 158 is secured to and is carried by the lower end of the tube 150. It is adapted to engage selectively internal clutch teeth formed in the hubs 148 and 140 of the levers 146 and 142. When the tube 150 is positioned as shown in FIGURE 3, the key 158 engages the teeth in the hub 148. When the tube 150 is rotated about its axis, lever 146 is rotated in one direcion or the other. This controls speed ratio shift elements in the power transmission mechanism thereby conditioning the manually controlled power transmission for either the low speed ratio operation or reverse drive operation depending upon the direction of oscillation.

If the key 158 is shifted in an upward or right-hand direction, it becomes disengaged from the hub 148 and engages instead the hub 140, which also is formed with clutch teeth as indicated. The shift tube 150 can be rotated about its axis and shifted in the direction of its axis by means of a shift cane located within the vehicle passenger compartment. Any one of a known variety of shift cane mechanisms can be employed for this purpose.

The tube 150 is telescopically positioned within an upper shift tube 160 which in turn can be rotated and reciprocated directly by the driver controlled shift cane mechanism. A valve operated fork, as seen in FIGURE 4B at 162, includes a supporting threaded adapter 164 which is welded or otherwise secured in a fixed fashion to the upper tube 160. The outer stationary tube 138 is apertured at 166. The free end of fork 162 is turned in the direction of the axis of the tubes 150 and 160 and is bifurcated to form a pair of spaced apart forked parts 168 and 170, as best seen in FIGURE 6. The adapter 164 receives a threaded portion of the fork 162. The extreme inner end of fork 162 extends within the inner tube 150 as shown at 172, a suitable elongated opening 174 being provided for this purpose in tube 150 as indicated best in FIGURES 4B and 5. This end 172 is situated between the split ends of a C-shaped spring 175, the center portion of which is spot welded or otherwise secured permanently to the interior of the tube 150. Spot welds are illustrated in FIGURE 3 at 176. The ends of the C-shaped spring 175 also engage a stud 178 which is formed on one end of a form of a valve body support rod 180. This rod is threadably received within a threaded adapter 182 which may be welded or otherwise secured permanently to the tube 150. Thus, as the tube 160 is rotated, the preload of the spring 124 will tend to cause tube 150 to rotate in unison with it. This then will cause the support 180 to rotate about the axis of the tubes 150 and 160. The opening 166 is sufficiently wide to permit motion of the support 180 and the fork 162.

The support 180 carries a valve body 184. A valve chamber 186 is formed in the body 184 and it receives a cushioning valve element 188 having a disc portion 190 and a stem 192. Valve element 188 is urged into a sealing position by a valve spring 194. A sealing ring which may be formed of rubber surrounds the periphery of disc portion 190 as indicated at 196, is urged into sealing engagement with a valve seat ring 198, which is held fast within chamber 186 by a snap ring 200. The disc portion 190 is formed with a bleed orifice 202 which establishes a restricted fluid connection between chamber 186 and the atmosphere. Chamber 186 communicates also through a fitting 204 with the previously described passage 102.

As best seen in FIGURES 5 and 8, the stationary tube 138 has formed thereon a pair of arms 206 and 208. These are secured at their innermost ends to the exterior of tube 138. The extended ends are spaced apart as best indicated in FIGURES 9 and 10.

When the shift tube 150 assumes a position corresponding to the low-and-reverse position of the shift lever 146, the ends of the arms 206 and 208 are axially misaligned with respect to the stem 192 of the valve element 188. This is illustrated best in FIGURE 5. Thus when the shift tube 150 is rotated, the valve body 184 will rotate with it. The ends of the arms 206 and 208 will not engage the stem 192 under these conditions, however, since the arms are misaligned as previously mentioned. Thus the valve element 188 will remain in a closed position. If the friction clutch is engaged upon movement of the diaphragm piston assembly 178 to a clutch engaging position, clutch engagement will occur with a cushioning action because of the restriction that is introduced into the passage 102 by the valve element 188. This cushioning action is desirable in transmission of the type with which I am concerned since a speed ratio shift into the low speed ratio or the reverse drive ratio usually is initiated by the operator when the engine is idling and the driveline is not delivering driving torque. Thus an undesirable inertia load normally would be imposed upon the driveline if the friction clutch were to be engaged under these conditions. The cushioning action on the valve 188, however, avoids the harshness that normally would be experienced during such a shift.

If the shift tube is shifted to a position corresponding to the intermediate or high speed ratio position of the shift lever 142, the valve element 188 will be brought into axial alignement with the ends of the arms 206 and 208. If the tube 150 then is shifted after it assumes intermediate or high speed position, either one or the other of arms 206 or 208 will engage stem 192 when a shift is initiated. This will cause valve element 188 to become unseated as indicated in FIGURE 7. This establishes a direct connection between passage 204 and the atmosphere, and the flow restricting orifice 202 is bypassed. The lower side of the diaphragm piston assembly 178 of the servo 168 then is open to atmosphere and the friction clutch then is allowed to engage rapidly. This action is not desired during such a shift since the shift occurs under torque and an excessive amount of slipping would occur.

Formed also in the valve body 184, as seen in FIGURES 6, 7, and 11 through 17, is a second valve chamber 210. A vacuum valve 212 having a disc portion 214 and a stem 216 formed on the periphery of the disc portion is a circular ring seal 218 which may be formed of rubber. This seal engages a valve seat 220. Valve 212 is urged into sealing engagement with the seat 225 by a valve spring 222 which is anchored against a stop 224 positioned within chamber 210. A flexible boot 226 covers the chamber 210 and the stem 216 extends through a central opening formed in the boot 226. However, the inner end of the chamber 210 is ported to provide communication with a conduit 228 which extends to the output side of an engine manifold vacuum booster tank. Such a tank forms a part of a manifold vacuum booster mechanism of known construction.

The valve chamber 210 communicates also with an internal passage 230 which communicates in turn with passage 118. As explained previously, this passage 118 communicates with the servo pressure feed passage 100 whenever the engine is operating at a speed faster than idle speed. This communication takes place through the lubrication valve structure.

An internal vent passage 232 also is formed in the valve body 184. It communicates with passage 230 and intersects an air vent in chamber 234. Slidably positioned within this valve chamber 234 is a vent valve plunger 236. This plunger is biased in a right-hand direction, as viewed for example in FIGURE 6, by means of a valve spring 238. The inner end of the chamber 234 communicates with the atmosphere through a vent port 240.

The valve element 236 is formed with a central opening 242. This opening is in communication with an annular groove in the valve element 236 through a port 244.

When the valve element 236 assumes the neutral position shown, for example, in FIGURE 4, port 244 registers with vent passage 232, thus allowing atmospheric pressure to be distributed through the valve vent 234 to the passage 118. This allows atmospheric pressure to be distributed to the upper side of the diaphragm piston assembly 78 thereby allowing the friction clutch to become engaged.

The bifurcated portions 160 and 170 of the fork 162 straddle the stem 216 of the valve element 212. As the fork 162 is shifted during a shifted sequence, the bifurcated portions 168 and 170 will cause opening and closing movement of the valve element 212 as will now be explained.

The mode of operation of the valve system for controlling the neutral clutch can best be illustrated by the sequential operating positions of the valve structure illustrated in FIGURE 6, 9, 10 and 11 through 17. When the transmission mechanism is conditioned for neutral and the friction clutch is applied, the valve structure will assume the position shown in FIGURE 6. In this instance, the valve element 236 is in an open position. In engages, however, the bifurcated portions 168 of the fork 162. The vacuum valve assumes the position shown in FIGURE 4. Atmospheric pressure is admitted through the vent valve to the upper side of the diaphragm piston assembly 78 of the servo 68 thereby allowing the clutch to become applied. During operation of the transmission mechanism under torque, the upper shift tube 160 can be rotated about its axis on either side of a zero position corresponding to the position shown in FIGURE 4.

During speed ratio shifts the spring loaded detent mechanism in the transmission structure resists movement of the shift levers 142 and 146. Thus rotation of the lower shift tube 150 is resisted. Because of this resistance, initial rotation of the upper shift tube 160 by the vehicle operator will result in movement of the valve element 236 from the position shown at FIGURE 4 to the position shown at FIGURE 8. This occurs as the spring 174 yields. After a predetermined pretravel occurs (for example 2°), the valve element 236 will seal the bleed passage 232. This is illustrated in FIGURE 11. If the shift tube 160 is rotated in the opposite direction a predetermined pretravel of 2°, this will result in shifting movement of the valve spool 236 in the opposite direction under the influence of spring 238. This again will cause the valve element 236 to seal the bleed passage 232.

When the operator rotates the upper shift tube 160 further during a speed ratio shift interval, bifurcated portion 170 of the fork 162 engages the stem 216 of the valve 212. This is illustrated in FIGURE 12. Of course, if the tube 160 were rotated in the opposite direction the other bifurcated portion 168 would engage the stem 216. The spring 174 yields to permit relative motion between the fork 162 and the valve body 184, the latter being carried by the lower shift tube 150 as explained previously.

Further rotation of the upper shift tube 160 with respect to the lower shift tube 150 will result in movement of the valve element 212 to the position shown in FIGURE 13. This causes the valve to become unseated thereby establishing a direct connection between passage 118 and conduit 228. The vacuum in the manifold vacuum booster tank then is made available to passage 118. The bleed passage 232 remains sealed by the valve element 236. As soon as the condition illustrated in FIGURE 13 is achieved, the reduced pressure in conduit 228 is distributed to passage 118 and through the lubrication valve to the passage 100. This causes the diaphragm piston assembly 78 to move in an upward direction thereby applying a clutch releasing force to the cable 62. The clutch release lever 52 is then rotated to a clutch releasing position. Further movement of the shift tube 160 then will allow shifting movement of the lower shift tube 150 and rotation of the shift levers 142 and 146 can occur, depending upon the axial position of the tubes 160 and 150. At this this the stud 172 formed on the end of the fork 162 reaches the end of the elongated slot 174. Movement of the tube 160 then is transmitted to the tube 150 through the lost motion connection provided by the slot 174 and the stud 172.

This shifting motion of the levers 142, 144 and 146 occurs as the clutch is disengaged.

During the shifting movement of the shift levers 142 or 146, the valve body moves from the position shown in FIGURE 6 to the position shown in FIGURE 16. The total angular travel involved here may be approximately 25°. When the valve structure assumes the position shown in FIGURE 15 the shift is completed. The vehicle operator then relaxes the pressure upon the shift cane, and the FIGURE 16 condition is achieved. This allows the tube 160 to rotate again with respect to the tube 150.

In FIGURE 11, there is shown the relative positions of the fork 162 and the valve body after the upper tube 160 is moved through an arc of about 2° from the position shown in FIGURE 16. At this time the valve element 212 is closed. This again interrupts communication between conduit 228 and the upper end of the diaphragm piston assembly 78. Further motion of the fork 162 with respect to the valve body 184 will result in the relative positions illustrated in FIGURE 16. Yielding of the spring 175 no longer occurs. At this time the valve 236 is shifted to the vent position which would allow vent passage 232 to communicate with the atmosphere through port 240. Atmospheric pressure again is admitted to the upper end of the diaphragm piston assembly 78 thereby allowing the clutch to become engaged. The shift is complete in this time.

In FIGURE 17 there is illustrated the relative positions of the various valve elements when the shift tube 160 is shifted in the opposite direction during a speed ratio change. In FIGURE 17 the fork 162 is shown in the position it assumes just prior to the opening movement of the valve element 212 which will cause clutch disengagement. At this time the vent passage 232 is closed by the valve element 236.

When the vehicle is coasting with the transmission gearing in a torque transmitting condition, the clutch remains applied until the engine speed slows to a value sufficiently low to permit the lubrication valve 108 to shift in a right-hand direction. At that time manifold vacuum, which is relatively high under closed throttle conditions, is caused to stroke the diaphragm piston assembly 78 in an upward direction thereby disengaging the clutch. This prevents lugging of the engine and it also prevents the engine from stalling when the vehicle comes to a stop.

The vehicle operator then can shift readily the shift tube 160 to the position corresponding to either reverse or low speed forward drive. This occurs while the valve stem 192 of the cylinder cushion valve 188 is misaligned with respect to the arms 206 and 208. If this shift occurs while the engine is idling and the vehicle is stopped and the operator subsequently opens the carburetor throttle valve for the engine, the resulting increase in engine speed will cause the lubrication valve to interrupt communication between the cylinder 70 and the engine intake manifold and to establish communication with passage 118 which in turn is subjected to atmospheric pressure. This will cause the clutch to engage, but the cushion valve element 188 will be closed under these conditions. Thus the clutch will engage with the cushioning action whenever the shift tube 160 assumes a position corresponding to intermediate and high speed ratio operation.

The stem 188 comes aligned with the arms 206 and 208 and the cushion valve becomes opened as the stem 192 engages one or the other of the arms as the shift tube is shifted to the intermediate or high speed ratio position.

If the vehicle is parked while the transmission mechanism is engaged in one of the driving speed ratio conditions, the clutch will become applied as vacuum in the booster becomes dissipated. It then becomes necessary to provide a means for releasing the clutch to permit the engine starter motor to turn the engine crankshaft. To provide for such a clutch release under these conditions, the lever 52 is provided with a hand pullout cable as explained previously. The lever may be pivoted by exerting a force on the pullout cable which will shift the clutch throwout bearing 28 in a left-hand direction. After the engine is started, engine intake manifold pressure or booster vacuum will energize the servo 68.

Having thus described a preferred embodiment of my invention, what I claim and desire to secure by U.S. Letters Patent is:

1. In a power transmission mechanism for use in an automotive vehicle driveline having an internal combustion engine with an air-fuel mixture intake manifold and a multiple speed ratio torque delivery gear system, a friction clutch adapted to be engaged and released to establish and disestablish a torque delivery path through said driveline, spring means for engaging said friction clutch, pneumatic servo means for applying a clutch releasing force to said clutch, a pressure feed passage means extending to said servo means for conducting a subatmospheric intake manifold pressure thereto, second passage means for conducting to said servo means another subatmospheric pressure, and engine speed sensitive valve means for connecting said servo means to said feed passage means at low engine speeds and to said second passage means at higher engine speeds.

2. In a driveline for an automotive vehicle having an internal combustion engine and a multiple speed ratio torque delivery gear system, a spring applied friction clutch in said driveline adapted to establish and disestablish a torque delivery path therethrough, pneumatically operated servo means for releasing said clutch including a movable wall connected to clutch controlling portions of said friction clutch, a pneumatic cylinder cooperating with said movable wall to define a pair of opposed pneumatic pressure chambers, a pressure feed passage communicating with one chamber, a first passage communicating with the engine intake manifold, a second passage adapted to conduct subatmospheric pressure, an engine speed sensitive valve means communicating with said first and second passages and with said feed passage for connecting said first passage to said feed passage at low engine speeds and for connecting said second passage to said feed passage at higher engine speeds, and means for retarding the displacement of air from one side of said movable wall when said servo means is conditioned for clutch engagement thereby cushioning the application of said clutch.

3. In a power transmission mechanism for use in an automotive vehicle driveline having an internal combustion engine with an air-fuel mixture intake manifold and a multiple speed ratio torque delivery gear system, a friction clutch adapted to be engaged and released to establish and disestablish a torque delivery path through said driveline, spring means for engaging said friction clutch, pneumatic servo means for applying a clutch releasing force to said clutch, a pressure feed passage extending to said servo means for conducting a subatmospheric intake manifold pressure thereto, second passage means for conducting to said servo means another subatmospheric pressure, and engine speed sensitive valve means for connecting said servo means to said feed passage at low engine speeds and to said second passage means at higher engine speeds, first valve means for retarding the rate of application of said clutch, and manually controlled valve means for overruling the retarding action of said first valve means during clutch engagement with said gear system conditioned for operation in a speed ratio higher than the lowest speed ratio.

4. In a driveline for an automotive vehicle having an internal combustion engine and a multiple speed ratio torque delivery gear system, a spring applied friction clutch in said driveline adapted to establish and disestablish a torque delivery path therethrough, pneumatically operated servo means for releasing said clutch including a movable wall connected to clutch controlling portions of said friction clutch, a pneumatic cylinder cooperating with said movable wall to define a pair of opposed pneumatic pressure chambers, a pressure feed passage communicating with one chamber, a first passage communicating with the engine intake manifold, a second passage adapted to conduct subatmospheric pressure, an engine speed sensitive valve means communicating with said first and second passages and with said feed passage for connecting said first passage to said feed passage at low engine speeds and for connecting said second passage to said feed passage at higher engine speeds, and means for retarding the displacement of air from one side of said movable wall when said servo means is conditioned for clutch engagement thereby cushioning the application of said clutch, and driver controlled means for rendering said cushioning valve means inoperable during clutch engagement with the gear system conditioned for operation in a speed ratio higher than the lowest speed ratio.

5. In a driveline for an automotive vehicle having an internal combustion engine with an air-fuel mixture intake manifold and a multiple speed ratio power transmission gear system, manually controlled linkage means for conditioning said gear system for operation in each of several speed ratios, a spring applied friction clutch in said driveline adapted to establish and disestablish a torque delivery path therethrough, a pneumatically operated servo means for releasing said friction clutch, passage means communicating with a source of subatmospheric pressure and extending to said pneumatically operated servo means for energizing the same, valve means disposed in and partly defining said passage means and manually controlled linkage means that is sensitive to the torque applied to said ratio controlling linkage means for interrupting distribution of subatmospheric pressure through said passage means when the manual effort applied to said ratio controlling means is less than a predetermined preload and for establishing communication between said pneumatic servo means and said subatmospheric pressure source when said manual shifting effort exceeds said preload.

6. In a driveline for an automotive vehicle having an internal combustion engine with an air-fuel mixture intake manifold and a multiple speed ratio power transmission gear system, manually controlled linkage means for conditioning said gear system for operation in each of several speed ratios, a spring applied friction clutch in said driveline adapted to establish and disestablish a torque delivery path therethrough, a pneumatically operated servo means for releasing said friction clutch, passage means communicating with a source of subatmospheric pressure and extending to said pneumatically operated servo means for energizing the same, valve means disposed in and partly defining said passage means and manually controlled linkage means that is sensitive to the torque applied to said ratio controlling linkage means for interrupting distribution of subatmospheric pressure through said passage means when the manual effort applied to said ratio controlling means is less than a predetermined preload and for establishing communication between said pneumatic servo means and said subatmospheric pressure source when said manual shifting effort exceeds said preload, and vent valve means connected to manually operable parts of said linkage means for establishing communication between said servo means and the atmosphere when communication between said servo means and said subatmospheric pressure source is interrupted.

7. In a torque delivery driveline for an automotive vehicle having an internal combustion engine with an air-fuel mixture intake manifold and a multiple speed ratio gear system, a spring applied friction clutch in said driveline adapted when engaged to establish a torque delivery path through said driveline, a pneumatic servo means for releasing said clutch, a source of manifold pressure, passage means interconnecting said source and said pneumatic servo, manually operable linkage means including a first portion connected to manually controlled elements and a second portion connected to ratio controlling elements of said gear system, valve means having separate parts defining in part said passage means between said pneumatic servo means and said source, one part being connected to one linkage portion and the other part being connected to the other linkage portion, and spring means for resisting relative movement of said portions, said valve means being urged to a passage means closing position when a preload at said spring means is overcome.

8. In a torque delivery driveline for an automotive vehicle having an internal combustion engine with an air-fuel mixture intake manifold and a multiple speed ratio gear system, a spring applied friction clutch in said driveline adapted when engaged to establish a torque delivery path through said driveline, a pneumatic servo means for releasing said clutch, a source of manifold pressure, passage means interconnecting said source and said pneumatic servo, manually operable linkage means including a first portion connected to manually controlled elements and a second portion connected to ratio controlling elements of said gear system, valve means having separate parts defining in part said passage means between said pneumatic servo means and said source, one part being connected to one linkage portion and the other part being connected to the other linkage portion, spring means for resisting relative movement of said portions, said valve means being urged to a passage means closing position when a preload of said spring means is overcome, and vent valve means including a first part connected to one linkage portion and a second relatively movable part connected to the other linkage portion for connecting said servo means to the atmosphere when shifting effort on said one linkage portion is terminated.

9. In a driveline for an automotive vehicle having an internal combustion engine with an air-fuel mixture intake manifold and a multiple speed ratio power transmission gear system, manually operated ratio controlling means for conditioning said gear system for operation in each of several speed ratios, a spring applied friction clutch in said driveline adapted to establish and disestablish a torque delivery path therethrough, a pneumatically operated servo means for releasing said friction clutch, passage means communicating with a source of subatmospheric pressure and exending to said pneumatically operated servo means for energizing the same, valve means disclosed in and partly defining said passage means and linkage means sensitive to the torque applied to said ratio controlling means for interrupting distribution of subatmospheric pressure through said passage means when the manual effort applied to said ratio controlling means is less than a predetermined preload and for establishing communication between said pneumatic servo means and said subatmospheric pressure source when said manual shifting effort exceeds said preload, vent valve means connected to manually operable parts of said linkage means for establishing communication between said servo means and the atmosphere when communication between said servo means and said subatmospheric pressure source is interrupted, and a lost motion connection between said ratio controlling means and said manually operated parts.

10. In a torque delivery driveline for an automotive vehicle having an internal combustion engine with an air-fuel mixture intake manifold and a multiple speed ratio gear system, a spring applied friction clutch in said driveline adapted when engaged to establish a torque delivery path through said driveline, a pneumatic servo means for releasing said clutch, a source of manifold pressure, passage means interconnecting said source and said pneumatic servo, manually operable linkage means including a first portion connected to manually controlled elements and a second portion connected to ratio controlling elements of said gear system, valve means having relating movable parts for controlling pressure distribution through said pressure means between said pneumatic servo means and said source, one part being connected to one linkage portion and the other part being connected to the other linkage portion, spring means for resisting relative movement of said portions, said valve means being urged to a passage means closing position when a preload of said spring means is overcome, and a lost motion connection between first and second linkage means portions.

11. In a torque delivery driveline for an automotive vehicle having an internal combustion engine with an air-fuel mixture intake manifold and a multiple speed ratio gear system, a spring applied friction clutch in said driveline adapted when engaged to establish a torque delivery path through said driveline, a pneumatic servo means for releasing said clutch, a source of manifold pressure, passage means interconnecting said source and said pneumatic servo, manually operable linkage means including a first portion connected to manually controlled elements and a second portion connected to ratio controlling elements of said gear system, valve means having separate parts defining in part said passage means between said pneumatic servo means and said source, one part being connected to one linkage portion and the other part being connected to the other linkage portion, spring means for resisting relative movement of said portions, said valve means being urged to a passage means closing position when a preload at said spring means is overcome, and vent valve means including a first part connected to one linkage portion and a second relatively movable part connected to the other linkage portion for connecting said servo means to the atmosphere when shifting effort on said one linkage portion is terminated, and a lost motion connection between said first and second linkage means portions.

12. A semiautomatic control system for an automotive vehicle driveline having an internal combustion engine with an air-fuel mixture intake manifold and a friction clutch engageable to establish a torque delivery path through said driveline, spring means for normally applying said clutch, pneumatically operated servo means for releasing said clutch, a manually operable speed ratio control comprising a first linkage member adapted to be moved manually and a second linkage member adapted to be connected to ratio controlling portions of said driveline, a lost motion connection between said linkage members, spring means for resisting relative motion of said linkage member within the extreme limiting position permitted by said lost motion connection, a source of a subatmospheric manifold pressure, passage means connecting said source and said servo means, valve means including a first portion connected to one linkage member and another portion connected to the other linkage member, said valve means being disposed in and partly defining said passage, said valve portion being situated in registry and closing said passage means when manual shifting effort on said linkage member is less than a predetermined value, said valve portions being relatively movable to open said passage means when a shifting effort greater than said predetermined value is applied to said linkage members.

13. A semiautomatic control system for an automotive vehicle driveline having an internal combustion engine with an air-fuel mixture intake manifold and a friction clutch engageable to establish a torque delivery path through said driveline, spring means for normally applying said clutch, pneumatically operated servo means for releasing said clutch, a manually operable speed ratio control comprising a first linkage member adapted to be moved manually and a second linkage member adapted to be connected to ratio controlling portions of said driveline, a lost motion connection between said linkage members, spring means for resisting relative motion of said linkage member within the extreme limiting position permitted by said lost motion connection, a source of a subatmospheric manifold pressure, passage means connecting said source and said servo means, valve means including a first portion connected to one linkage member and another portion connected to the other linkage member, said valve means being disposed in and partly defining said passage, said valve portion being situated in registry and closing said passage means when manual shifting effort on said linkage member is less than a predetermined value, said valve portions being relatively movable to open said passage means when a shifting effort greater than said predetermined value is applied to said linkage members, and vent valve means comprising a first part carried by one linkage member and a relative movable part adapted to be actuated by said other linkage member, said vent valve means assuming an open position and establishing a connection between the atmosphere and said passage means when the shifting effort on said linkage member is relieved.

References Cited
UNITED STATES PATENTS

| | | | |
|---|---|---|---|
| 2,133,053 | 10/1938 | Kelley | 192—.075 |
| 2,720,295 | 10/1955 | Bradbury | 192—.08 |
| 3,245,502 | 4/1966 | Randol | 192—.075 |

MARK NEWMAN, *Primary Examiner.*

A. T. McKEON, *Assistant Examiner.*